Jan. 9, 1968   G. A. ENGLISH   3,362,630

RESILIENT HUB AND AIR MOVING DEVICE

Filed May 4, 1966

INVENTOR.
GEORGE A. ENGLISH
BY
McConnich, Paulding & Huber
ATTORNEYS

United States Patent Office 3,362,630
Patented Jan. 9, 1968

3,362,630
RESILIENT HUB AND AIR MOVING DEVICE
George A. English, 306 Hillside Ave.,
Torrington, Conn. 06790
Filed May 4, 1966, Ser. No. 547,588
7 Claims. (Cl. 230—134)

ABSTRACT OF THE DISCLOSURE

A resilient hub comprising a resilient grommet mounting a fan on a shaft and having an associated spring coiled about the shaft and in a shaft groove with an enlarged spring end loop engaging and securing the fan in position.

---

This invention relates to resilient hubs for rotating elements and, more specifically, to a resilient hub particularly adapted for use in air moving devices and which comprises a resilient hub member and a coil spring.

It is the general object of the invention to provide a resilient hub of the type mentioned which is of a desirably simple construction capable of being produced at economic advantage and which readily accommodates shaft and/or other misalignment and which also provides for vibration isolation between a shaft and an air moving device.

Another and a more specific object of the invention resides in the provision of a resilient hub of the type mentioned which is particularly adapted for a high degree of ease and convenience in assembly, the hub and shaft being adapted for ready assembly in any relative angular position by endwise movement of one element with respect to the other.

The drawing shows preferred embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

Figure 1:
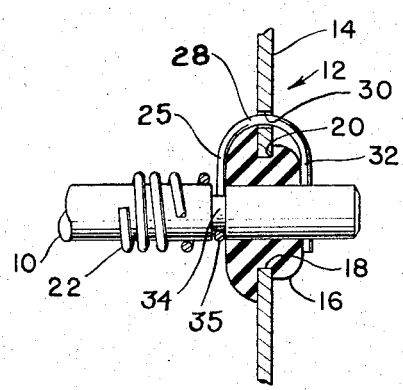
FIG. 1 is a vertical sectional view showing a resilient hub constructed in accordance with the invention and in assembly with a drive shaft and a radial member driven thereby.
Figure 2:
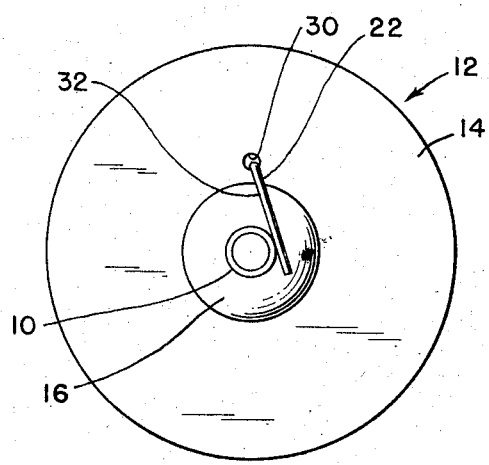
FIG. 2 is an end view of the assembly of FIG. 1.

Referring particularly to FIGS. 1 and 2, a conventional drive shaft is shown at 10 for an air moving device indicated generally at 12 and which is represented merely as a radially extending member 14. The air moving device 12 may vary widely in form and may consist in a conventional axial fan, a centrifugal blower or, a transverse or tangential flow blower. Thus, for example, the radial member 14 may comprise an end plate of a transverse flow blower. Operating power for the drive shaft may of course take conventional form and the shaft may be rotated by a belt and pulley arrangement or may be connected directly with an electrical motor.

The radially extending member or end plate 14 is centrally apertured and preferably a circular opening 18 is provided therein in a conventional manner. The opening 18 is substantially larger in diameter than the shaft 10 and a resilient hub or portion 16 is disposed therein and mounted on the shaft so as to be rotated therewith. An outer or peripheral part of the hub portion 16 is adapted to engage the radial member 14 and, as shown, a radially outwardly opening annular groove 20 is provided at the periphery of the said hub portion. Preferably an elastomeric material is employed in forming the hub portion 16 and the hub portion may be advantageously formed in a molded construction.

A coil spring 22 disposed on and about the shaft 10 has at least one convolution snugly fitting and frictionally gripping the shaft in accordance with the present invention, and as shown, a spring 22 is provided with a plurality of convolutions so arranged on the shaft 10. The diameter of the spring convolutions is slightly less than that of the shaft 10. Further and in accordance with the invention, the spring 22 has an end portion which engages the aforementioned radial member or end plate 14 and which is connected therewith whereby to drivingly connect the shaft 10 with the member 14 and yet accommodate angular misalignment and provide for vibration isolation.

The end portion of the spring 22 is shown as being a generally U-shaped configuration with generally radially outwardly and inwardly extending legs 25 and 32 and a body portion 28. The generally radially outwardly extending leg 25 is disposed on the spring side of the resilient hub portion 16 and the generally radially inwardly extending leg 32 is disposed on an opposite side of said hub portion. The body 28 of the spring end portion is entered in a small opening 30 spaced radially outwardly from the central aperture 18 in the radially extending member or end plate 14.

As will be apparent, the end portion of the spring 22 is restrained against substantial rotation relative to the radial member 14 and the convolutions of the spring 22 are wound snugly about and in functional gripping relation about the shaft 10 so as to be drivingly connected therewith. That is, the spring convolutions are wound about the shaft 10 in such direction and manner that a "clutching action" occurs when a driving torque is applied to the shaft whereupon the spring efficiently drives the radial member 14 and the associated air moving device. Axial restraint is of course provided for in the gripping action of the spring convolutions about the shaft 10 but it is the presently preferred practice to provide additional means for securing the spring 10, the hub portion 16, and the radial member 14 against relative axial movement along the shaft.

In accordance with one aspect of the invention, axial restraint of the aforesaid elements is provided for by at least one radially extending groove which is at least partially annular in form and which is provided in the shaft 10 adjacent the resilient hub portion 16. Such a groove is shown at 34 in FIG. 1 and is annular in form with a spring convolution 35 entered therein. The spring convolution 35, disposed immediately adjacent the aforesaid spring end portion, is slightly smaller in diameter than the remaining spring convolutions and serves to positively secure the spring, the hub portion 16 and the radial member 14 against axial displacement. The aforementioned outwardly and inwardly extending legs 24 and 32 are disposed at least approximately in engagement with opposite radial surfaces of the hub portion 16 whereby to secure the same as shown.

The ease and convenience of assembly of the hub and shaft of the present invention will be readily apparent. With the hub portion 16 entered in and secured in place within the central aperture of a radial member or end plate 14 a spring such as 22 can be readily assembled with the end plate or radial member. That is, the end portion of the spring can be easily entered in the opening 30 of the end plate whereupon the resulting subassembly can be conveniently mounted on the end of the shaft 10 by relative endwise movement of the shaft and the subassembly.

Figure 3:
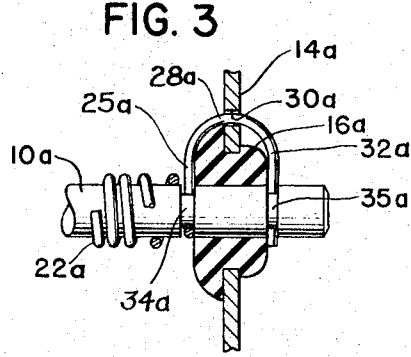
FIG. 3 is a vertical sectional view showing a resilient hub which forms a second embodiment of the present invention and which requires a slightly modified shaft construction.
Figure 4:
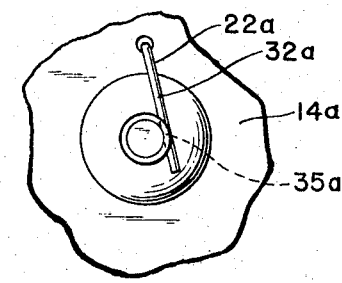
FIG. 4 is an end view of the FIG. 3 assembly.

A second or alternative embodiment of the invention shown in FIGS. 3 and 4 is quite similar to the FIG. 1 embodiment and a shaft 10a may be substantially identical with the shaft 10. End plate 14a, hub portion 16a and spring 22a may be identical with the corresponding elements of FIG. 1. Slight modification in the shaft 10a resides in the provision of a groove 35a similar to the groove 34 of FIG. 1 but disposed on a side of the hub portion 16a opposite the spring 22a. A groove 34a may also be provided in the shaft 10a on the side thereof adjacent the spring 22a. Thus, an inwardly extending leg 32a of the spring end portion can be entered in the groove 35a whereby to provide additional restraint against relative axial movement of the elements.

The invention claimed is:

1. The combination comprising a cylindrical drive shaft having at least one generally radially extending groove which is at least partially annular, an air moving device having a generally radially extending and centrally apertured rotatable member adapted to be drivingly connected to a shaft substantially smaller in diameter than said central aperture, said member having a small opening disposed radially outwardly of said central aperture, a centrally apertured resilient hub portion mounted on the shaft adjacent said groove and engaging said radial member adjacent the central aperture therein, a coil spring having at least one convolution disposed snugly around and rotatable with said drive shaft adjacent said resilient hub portion, a part of said spring being received in said groove to restrain the spring against axial movement relative to said shaft, and said spring including an end portion which extends radially outwardly beyond said hub portion and which engages and is connected with said radial member whereby to resist axial movement of said radial member and drivingly to connect the shaft with the member for transmission of torque therebetween.

2. The combination as set forth in claim 1 wherein said groove is annular and is located immediately adjacent said resilient hub portion on an axial side thereof adjacent said coil spring, and wherein said spring has a convolution immediately adjacent said spring end portion of a diametral size slightly less than that of the remainder of the spring convolutions and which is entered in said groove whereby to restrain the spring, said radial member, and said hub portion against axial movement relative to the shaft.

3. The combination as set forth in claim 2 wherein said spring end portion is generally U-shaped having a generally radially outwardly extending leg which engages one side of said resilient hub portion, a body portion entered in said small opening in said radial member, and a generally radially inwardly extending leg disposed on the opposite side of said resilient hub portion and engaging the same, said hub portion having an outwardly opening annular groove at its periphery for receiving a portion of said radial member adjacent said central aperture therein wherbey to restrain the member against axial movement relative to the shaft.

4. The combination as set forth in claim 1 wherein said shaft groove is disposed on a side of said resilient hub portion opposite said spring, and wherein said spring end portion is generally U-shaped with a radially outwardly extending leg, a body portion entered in said small opening in said radial member, and a radially inwardly extending leg disposed on said opposite side of said resilient hub section and entered in said groove to restrain the spring, the hub section, and the radial member against axial movement relative to the shaft.

5. The combination as set forth in claim 4 wherein said resilient hub portion has an outwardly opening annular groove at its periphery for receiving an annular portion of said radial member adjacent the central aperture therein and for restraining said member against axial movement with respect thereto.

6. The combination as set forth in claim 1 wherein said shaft has first and second generally radially extending and radially outwardly opening annular grooves disposed respectively on a side of said resilient hub portion adjacent the spring and on an opposite side thereof, wherein said spring has a convolution immediately adjacent said spring end portion of a diametral size slightly less than that of the remaining spring convolutions and which is entered in said annular groove on the side of said resilient hub portion adjacent said spring, and wherein said spring end portion is generally U-shaped having generally radially outwardly and inwardly extending legs and a body portion, said outwardly extending leg being disposed on said spring adjacent side of said resilient hub portion, said body portion being entered in said small opening in said radial member, and said inwardly extending leg being disposed on said opposite side of said resilient hub portion and entered in the corresponding groove in said shaft.

7. The combination as set forth in claim 6 wherein said resilient hub portion engages said outwardly and inwardly extending legs of said spring end portion and wherein said hub portion is provided with an outwardly opening annular recess in its periphery, said recess receiving an annular portion of said radial member adjacent the central aperture in said member.

References Cited

UNITED STATES PATENTS

| 1,431,401 | 10/1922 | Hupp | 64—27 |
| 2,907,189 | 10/1959 | Flieg | 64—27 |
| 3,219,261 | 11/1965 | Laing | 230—125 |

HENRY F. RADUAZO, *Primary Examiner.*